G. V. PAYNE.
METHOD FOR ASCERTAINING LEAKS IN UNDERGROUND FLUID PRESSURE PIPES.
APPLICATION FILED MAR. 9, 1917.
1,252,488.
Patented Jan. 8, 1918.
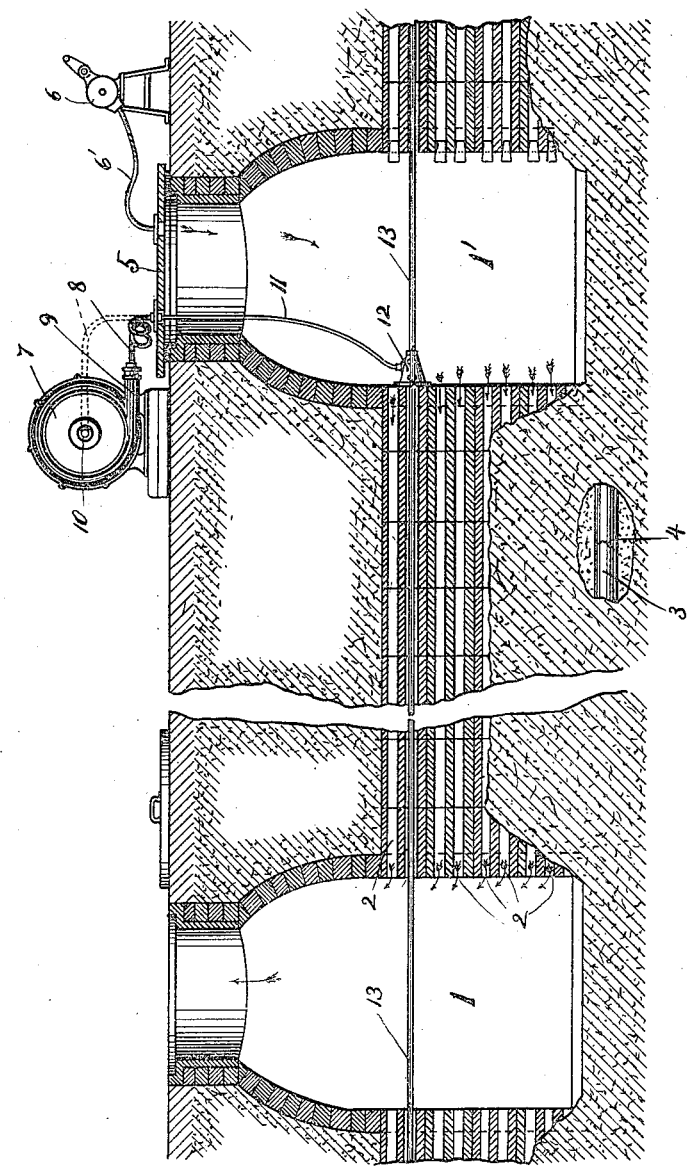
WITNESSES:
J. A. Klostermann.
B. J. Richards
INVENTOR:
GEORGE V. PAYNE,
BY Joshua R. H. Popps
HIS ATTORNEY.

UNITED STATES PATENT OFFICE.

GEORGE V. PAYNE, OF CHICAGO, ILLINOIS.

METHOD FOR ASCERTAINING LEAKS IN UNDERGROUND FLUID-PRESSURE PIPES.

1,252,488.  Specification of Letters Patent.  Patented Jan. 8, 1918.

Application filed March 9, 1917. Serial No. 153,743.

*To all whom it may concern:*

Be it known that I, GEORGE V. PAYNE, a citizen of the United States, and a resident of the city of Chicago, county of Cook, and State of Illinois, have invented certain new and useful Improvements in Methods for Ascertaining Leaks in Underground Fluid-Pressure Pipes, of which the following is a specification.

My invention relates to improvements in methods for ascertaining the location of a leak in a fluid pressure pipe such as the conventional underground gas pipe, and has for its object the provision of a method whereby the location of a leak in a pipe of the character mentioned, may be ascertained with comparative ease and expedition, the present invention constituting an improvement or variation over that disclosed in my prior Patent No. 1,041,156, granted October 15th, 1912.

Other objects will appear hereinafter.

With these objects in view my invention consists in the method of procedure hereinafter described and claimed.

The invention will be best understood by reference to the accompanying drawing forming a part of this specification and which is a fragmentary sectional view through a section of ground, exposing the underground vaults, conduits and fluid pressure pipe, and illustrating the employment of a method embodying my invention.

Referring to the drawing, I have illustrated two vaults or manholes 1 and 1' which are embedded or sunk in the ground and constructed in the usual manner. Extending between the vaults 1 and 1' are conduits or ducts 2 which ordinarily serve to accommodate the electric, telegraph or other wires which are buried below the surface of the ground, said conduits being formed, as is usual, of a plurality of alining sections, the joints between adjacent sections of said conduits being left unsealed so that gases or fluids in the ground in the vicinity may enter through said joints into the interiors of said conduits. Arranged adjacent the conduits 2 is a fluid pressure pipe 3, such as an ordinary gas pipe, through which is conveyed the illuminating gas. In the pipe 3 is shown the rupture or leak 4 which it is desired to locate in order that the leak or rupture may be stopped or repaired. The construction is old and well known, the same being used at the present time in most cities or towns of considerable size.

In the practice of my invention it is first determined between which two vaults the leak in the fluid pressure pipe has occurred, this being readily ascertained through the sense of smell, since upon a leak occurring in the fluid pipe, the fluid will permeate the soil in the vicinity and finds its way to the conduits, whence it will pass to and be discharged into the adjacent vaults. This being so by removing the closures of said vaults, the presence of a strong odor will indicate that a leak has occurred adjacent thereto.

After thus determining a leak which exists between the vaults 1 and 1', illustrated in the drawing, the usual covers of the vaults are removed and a specially designed sealing cover 5 is placed on one of the vaults, as the vault 1'. The cover 5 is connected by a flexible hose 6' with an ordinary blower 6 and by means of which air may be forced into the vault 1' and thence through the conduits 2 into and out of the vault 1. This will clear the vaults and conduits of accumulated gas so it will be known that the only gas present is the gas freshly entering the conduits, whereupon the current of air from the blower 6 is discontinued. Another blower 7 is provided and connected with the cover 5 by means of a flexible hose 8, said hose 8 being arranged to be coupled to the discharge spout 9 of the blower 7 or to the intake 10 thereof. Pipe 8 is connected through cover 5 with another flexible hose 11, carrying at its lower end a split packing head 12 adapted to be placed over an ordinary electric wire cable 13 passing through one of the conduits 2 and sealed thereon and around the mouth of the conduit so that a current of air may be forced from the blower 7 through the corresponding conduit 2, as indicated. When this current has been continued sufficiently until it is certain that the corresponding conduit has been entirely cleared of accumulated gas, the hose 8 is disconnected from the discharge pipe 9 of the blower 7 and connected with the intake 10 of said blower so as to reverse the current through the conduit 2 being treated, and the air discharged from the blower 7 is tested by the sense of smell until the first presence of gas is detected. The capacity of the blower 7 is known or determined from which the quantity of the reversed current of air may be readily determined. The diameter of the conduit 2 being tested is known or may be readily determined and from this the location in the conduit at which the gas is entering the same, may be readily calculated. For instance, we will suppose that the capacity of the conduit being tested is one cubic foot of air per linear yard thereof, and the test shows that 10 cubic feet of air was withdrawn from the reversed current before the presence of gas was detected. This indicates at once that the gas is entering a point 36 feet from the vault 1' and an excavation is made at this point to search for the leak which may be then readily found in the usual manner.

While I have illustrated and described the preferred method and forms of construction for carrying my invention into effect, these are capable of variation and modification without departing from the spirit of the invention. I, therefore, do not wish to be limited to the precise details of the method and construction set forth, but desire to avail myself of such variations and modifications as come within the scope of the appended claims.

Having described my invention what I claim as new and desire to secure by Letters Patent is:

1. The method of ascertaining the location of a leak in an underground fluid pressure pipe which consists in creating a current passing the location of the leak; testing said current for the presence of a leaking fluid; and determining the location of the leak from the quantity of the current, substantially as described.

2. The method of ascertaining the location of a leak in an underground fluid pressure pipe which consists in creating a current of air in one direction passing the location of the leak; reversing said current; testing said reversed current for the presence of the leaking fluid; and determining the location of the leak from the quantity of the reversed current, substantially as described.

3. The method of ascertaining the location of a leak in the neighborhood of a plurality of ducts which consists in creating a current of air through all of said ducts; then creating a current of air through one of said ducts; then reversing the current of air through said one duct; testing said reversed current for the presence of the leaking fluid; and determining the location of the leak from the quantity of the reversed current, substantially as described.

4. The method of ascertaining the location of a leak in the neighborhood of a plurality of underground ducts connecting two underground vaults, which consist in forcing air into one of said vaults and through all of said ducts; then creating a current of air through one of said ducts; reversing the current of air through said one duct; testing the reversed current of air for the presence of the leaking fluid; determining the quantity of the reversed current of air withdrawn until the leaking fluid is detected; and then calculating the location of the leak from the quantity of air withdrawn, substantially as described.

In testimony whereof I have signed my name to this specification in the presence of two subscribing witnesses.

GEORGE V. PAYNE.

Witnesses:
    JOSHUA R. H. POTTS,
    HELEN F. LILLIS.

Copies of this patent may be obtained for five cents each, by addressing the "Commissioner of Patents, Washington, D. C."